Dec. 10, 1963   W. H. LEE   3,114,094
ADJUSTABLE SPEED BRUSHLESS A.C. MOTOR
Filed Nov. 2, 1961   3 Sheets-Sheet 1

INVENTOR.
WILLIAM H. LEE,
BY Bosworth, Sessions,
Herrshoff & Knowles
ATTORNEYS.

United States Patent Office 3,114,094
Patented Dec. 10, 1963

3,114,094
ADJUSTABLE SPEED BRUSHLESS A.C. MOTOR
William H. Lee, Drury Lane, Waite Hill Village,
R.D. 3, Willoughby, Ohio
Filed Nov. 2, 1961, Ser. No. 149,654
7 Claims. (Cl. 318—238)

This invention relates to alternating current dynamo-electric machines of brushless configuration and in particular to adjustable speed induction motors embodying brushless means for controlling their secondary impedance and thus their speed.

Alternating current motors of the induction type are highly advantageous because of their efficiency, sturdiness and simple construction. Though widely used, the application of induction motors has been limited somewhat by problems connected with controlling the speed of such motors. It is well known that, for a given torque, the speed of an induction motor is dependent upon the impedance of the secondary or rotor windings of the motor. Induction motor speed controls, therefore, may take the form of a secondary impedance control.

One known method of controlling secondary impedance in an induction motor is to bring the secondary windings out to slip rings on the shaft of the motor. By means of brushes riding on the slip rings, the secondary circuit is placed in circuit with the alternating current windings of a stationary saturable core reactor. With this arrangement, the impedance of the secondary circuit can be varied in accordance with the magnetic state of saturation of the reactor core as controlled by a direct current control winding on the reactor.

For some applications, this arrangement for controlling secondary impedance has serious disadvantages. One of these is that it requires slip rings and brushes which are not suitable for operation in some environments and under some conditions. Further, stationary saturable core reactors of sufficient power handling capacity are large and expensive when designed to operate at acceptable temperature levels, or if made smaller, require auxiliary cooling equipment such as blowers to dissipate the heat.

The present invention, therefore, relates to a stable and efficient speed control for induction motors in which the impedance of the motor secondary is controlled directly and without brushes or slip rings by a saturable reactor in magnetic circuit relationship with the secondary conductors. Control is accomplished directly through variation of the state of saturation of the reactor core by low power direct current energizing a control winding of the tractor and no complex circuitry employing tubes, switching and rectifying devices, resistors or capacitors is required. Further, the present invention provides such a variable speed alternating current motor that is compact and capable of being contained in a single housing and yet operates at acceptable temperature levels without the use of blowers or other auxiliary equipment.

Briefly, these results are accomplished by means of a saturable core reactor having a portion of the core mounted on the same shaft as the rotor of an induction motor and carrying conductors in circuit with the secondary of the induction motor. Control of the degree of saturation of the rotating core is effected by means of a stationary core portion including a stationary control winding energizable by direct current for producing a stationary and unidirectional flux field linking the rotating core member of the reactor. The impedance of the motor secondary to alternating current varies inversely with the degree of saturation of the reactor core and thus the torque and speed of the motor are controlled in accordance with the D.C. voltage energizing the stationary control winding. A smooth and stable control is thus provided which requires only small amounts of power in the form of the D.C. control voltage supplied to the reactor. By locating a saturable portion of the reactor on the same shaft as the rotor of the induction motor, connection between the reactor and the secondary of the motor can be accomplished in a completely brushless manner.

FIGURE 1 of the accompanying drawing is a side view of a brushless adjustable speed induction motor embodying a preferred form of the invention with parts broken away to show the internal construction of the machine on an axial plane.

Figure 1:
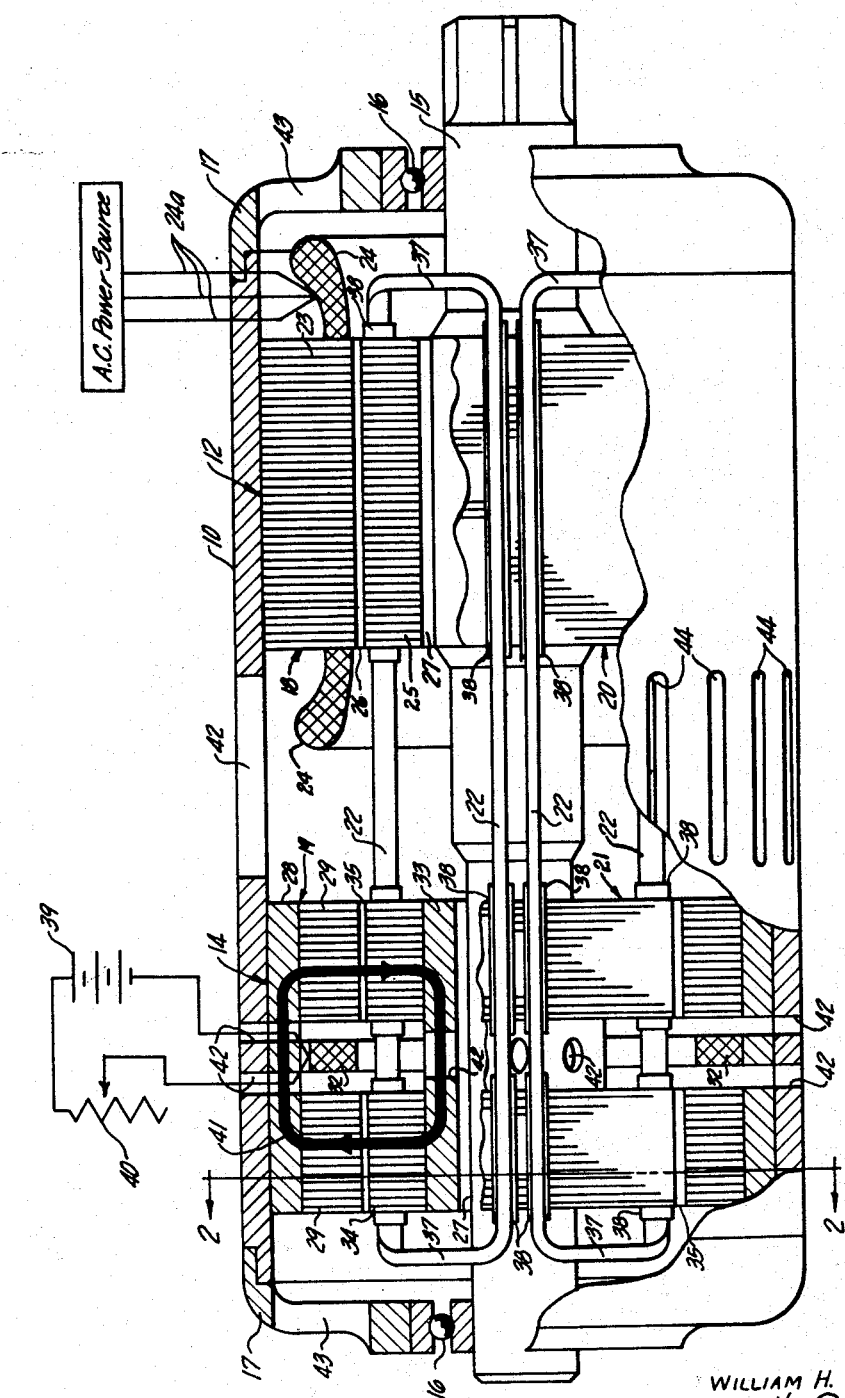

The major structures of the apparatus are a cylindrical housing 10 which encloses and supports the induction motor section indicated generally at 12 and the rotating reactor section indicated generally at 14. Shaft 15 is mounted in bearings 16 supported by housing 10 in end bells 17 removably held in place on the ends of housing 10 by any suitable means. A motor stator 18 and non-rotating member 19 of the reactor section are mounted inside housing 10 in a conventional manner. Shaft 15 carries the induction motor rotor indicated generally at 20 and the rotating member of the reactor indicated generally at 21. Secondary conductors 22 are carried by and extend through and between rotor 20 of the motor and the rotating member 21 of the reactor in a manner to be described below.

Stator 18 of the induction motor is of conventional design having a laminated core structure 23 carrying windings 24 arranged to produce a rotating flux field when energized through conductors 24a from a source of polyphase alternating current power.

Rotor 20 of the induction motor consists of a laminated core 25 mounted on shaft 15 for rotation concentrically with stator core 23 and is separated therefrom by a small annular air gap 26. Rotor core 25 of the motor is preferably provided with axial cooling passages 27 circumferentially spaced about the inner periphery of the core adjacent shaft 15. Passages 27 permit a flow of cooling air or fluid through the rotor core.

Non-rotating member 19 of reactor section 14 is made up of a radially outward annular portion 28 of magnetic material such as rolled steel or cast iron supported by housing 10. The remainder of non-rotating reactor member 19 comprises two axially spaced laminated saturable core portions 29 mounted coaxially within outer annular portion 28. The axial separation between these two portions is preferably located midway of the length of reactor section 14 and receives an annular control winding 32 whose purpose and function are described below.

Rotating member 21 of the reactor section consists of a radially inward annular portion 33 of magnetic material mounted on shaft 15 for rotation therewith. Inner annular portion 33 is preferably formed of rolled steel or cast iron. Two radially outward and axially spaced rotating portions 34 of laminated saturable magnetic material surround portion 33. Rotating member 21 of the reactor rotates concentrically within non-rotating member 19 and is separated therefrom by a small air gap 35. The laminated rotating core portions 34 are opposite non-rotating core portions 29. This relationship of the rotating and non-rotating portions of the reactor section provides for a magnetic circuit described hereafter.

The secondary conductors 22 extend axially through and between and are spaced circumferentially about the peripheral portions of rotor 20 of motor section 12 and rotating member 21 of reactor section 14. Secondary conductors 22 are associated in pairs by connecting together the ends of conductors as at 37 to form a plurality of electrically independent secondary circuit coils. The coil span is preferably approximately equal to the pole pitch of the machine.

Preferably, secondary conductors 22 are formed of relatively rigid bare copper bars having substantial cross-sectional area and are preferably inserted in holes or closed slots in the laminated portions of rotor 20 and rotating member 21 by suitable means such as wooden wedges. Slot insulation 38 is provided to insulate secondary conductors 22 from the laminated core portions. Such secondary conductors may constitute single turn windings and as such have a relatively low voltage induced therein by the rotating magnetic field of the motor stator. Because of the length of the conductors extending beyond the motor section, their resistance can be relatively high considering the sizable cross-sectional area. My invention is not limited, however, to secondary conductors such as described above. The secondary circuits may consist of a number of turns of smaller conductors or wires wound in secondary circuit pairs or coils of the form described in connection with the single turn conductors above. When multi-turn secondary circuit coils are employed, the windings must be insulated from each other and the cooling advantage achieved by use of the bare copper single turn secondary conductors is lost.

Regardless of the particular type of winding employed, the portions of the secondary conductors that extend through the reactor section offer substantial impedance to the flow of alternating current in the secondary of the motor so long as the iron in the reactor core portion 34 remains unsaturated and, according to the present invention, this impedance is controlled by controlling the saturation of the reactor core portions. In order to provide convenient control of the saturation of the reactor core portions and of the impedance of the secondary conductors, the control winding 32 is energized by a variable D.C. source such as battery 39 and variable resistance means 40 and produces a unidirectional and stationary flux field. The laminated core portions of the reactor tend to reduce eddy current losses resulting from the alternating current in the secondary circuits passing axially through the reactor, but the laminations do not substantially impede the unidirectional flux in the magnetic circuit since the flux created by the control winding passes through the core portions parallel to the laminations. The solid core portions 28 and 33 complete the magnetic circuit. The degree of saturation of the saturable portions 34 is dependent upon the strength of the flux field produced by the control winding 32 which is controlled by the magnitude of the direct current with which it is energized.

As is well known, the impedance to the flow of alternating current in a conductor having magnetic relationship with a saturable iron core is dependent upon the degree of saturation of the core. In the preferred form of this invention, the alternating current impedance of secondary conductors 22 of the motor is controlled by varying the saturation of rotor core portion 34 of the rotating reactor by means of the unidirectional field passing therethrough. The relative rotation between the two parts of the material providing the magnetic circuit has no appreciable effect upon the unidirectional field produced by control winding 32 and there tends to be no net current induced in conductors 22 by their rotation in the unidirectional field.

Magnetic separation is achieved in the illustrated machine by axial spacing of the cores of the two sections and by the use of non-magnetic end bells and/or shaft. The amount of axial spacing between the two sections 12 and 14 is also somewhat related to the resistance and, therefore, length of the secondary circuit conductors desired. It is also a factor in determining the cooling that may be provided for the machine as explained hereafter.

To promote cooling of the machine, axial cooling passages 27 are provided adjacent the shaft in rotor 20 and rotating member 21 of motor section 12 and reactor section 14, respectively. In addition, I prefer to provide circumferentially spaced passages 42 in reactor section 14 extending in a generally radial direction through housing 10 and non-rotating annular portion 28 into the annular space between core portions 29 and control winding 32 and between rotating core portions 34 and through rotating annular portion 33 to axial cooling passages 27 adjacent shaft 15.

Circumferentially spaced openings 43 in end bells 17 and openings 44 in the side wall of housing 10 in the region of the axial space between motor section 12 and reactor section 14 permit circulation of cooling air through the machine. Secondary conductors 22 extending between rotor 20 and rotating member 21 and beyond the outer ends thereof tend to function in the manner of centrifugal fans or blowers and promote the circulation of air in and about the windings, cores and secondary conductors of the machine and through the axial and radial passages and the air gaps.

In operation, when the stator windings of the induction-type motor are energized, alternating voltages are induced in the secondary conductors 22 carried by the rotor. The frequency and magnitude of these alternating voltages increase with the difference in angular velocity of the revolving flux field and rotor, the frequency of the induced voltages being equal to the frequency of the A.C. supply when the rotor is stopped. The interaction of the revolving flux field and the induced current of the secondary conductors produces a force on each of these conductors providing a resultant torque tending to turn the rotor. The magnitude of the resultant torque varies with the secondary current and the phase angle between the induced voltage and current in the rotor circuit. Therefore, the torque and thus the speed of the motor can be controlled by varying the reactive impedance of the secondary circuit.

Control of secondary reactive impedance is accomplished in the machine of this invention by the rotating reactor. When control winding 32 is not energized, the reactive impedance of the alternating current secondary is high for a given secondary frequency since there is a high rate of change of flux in the unsaturated iron with current. When a sufficient direct current is passed through control winding 32 to saturate saturable portions 34 of rotating member 21, the change in current in the alternating current secondary produces only very small changes in the flux of the core, and the reactive impedance of the alternating current secondary is very small. By adjustment of the direct current energizing the control winding 32, the reactive impedance of the alternating current secondary may be varied smoothly from its minimum to its maximum value.

Figure 2:
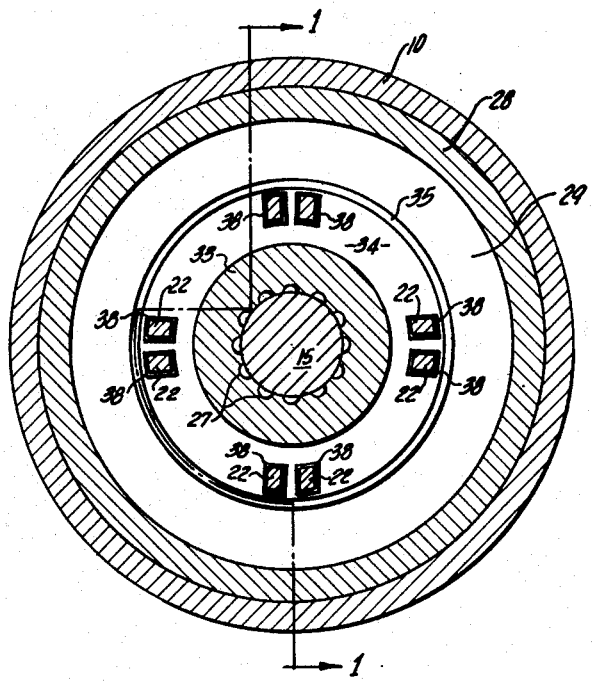
FIGURE 2 is a sectional end view taken in the plane of section line 2—2 of the motor in FIGURE 1 but without the sectioning shown in that figure. Also shown on FIGURE 2 is a section line 1—1 indicating the manner of sectioning employed in FIGURE 1.
Figure 3:
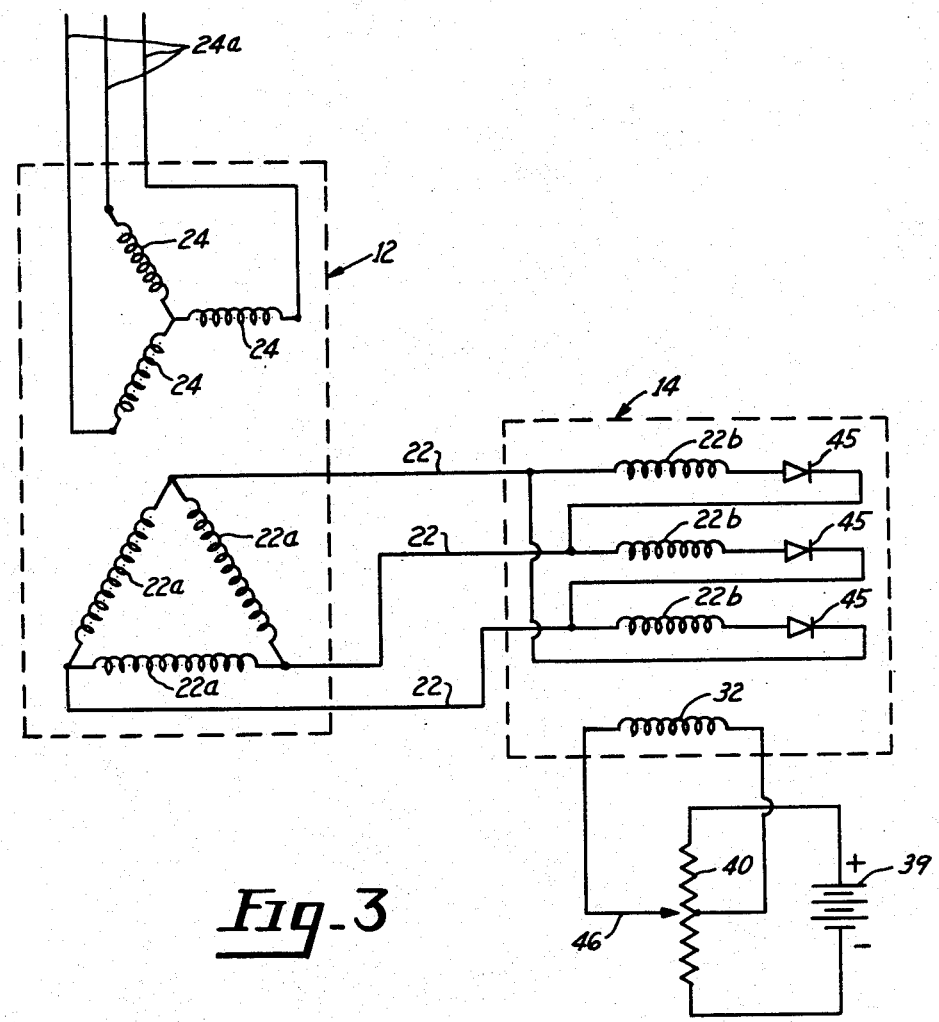
FIGURE 3 is a circuit diagram of a brushless adjustable speed induction motor embodying a modified form of the invention.

My invention also comprehends the use of self-saturating reactor principles in the control of the secondary impedance of the induction motor. FIGURE 3 shows a circuit diagram of a machine embodying my invention and utilizing such principles of secondary impedance control, like reference numerals being applied therein to like elements already shown and described in connection with FIGURES 1 and 2. Rectifiers 45 may be mounted for rotation on the rotor 20, 21 of the machine and connected in circuit between the motor section secondary windings 22a and reactor section secondary windings 22b whereby the alternating current in the rotor or secondary windings 22a of the motor section 12 are rectified to produce and supply direct current to suitably arranged windings 22a on the rotating portion 21 of the reactor section 14. In this manner, a portion of the power required to saturate the magnetic material of the reactor section 14 is supplied from the motor secondary circuit and less power is required by the stationary control winding 32 in the reactor section 14. The field 41 produced by the stationary coil 32 can be arranged to buck and/or augment the field produced by the direct current rotor windings to exercise control of the magnetic state of the saturable material by adjustment of the sliding contact 46 of variable resistance 40. When the self-saturating reactor scheme is employed, I prefer to use multi-turn secondary circuit coils or windings for ease and convenience in connection with the rotating rectifiers rather than rigid bare copper bars, for example.

It will be apparent that the secondary impedance and thus the torque of the induction-type motor in the device comprehended by my invention can easily and smoothly be controlled by means of a single D.C. current of low power. It will also be noted that variable and smooth control of the secondary impedance can be achieved and that the control is accomplished without the use of brushes.

A further advantage is found in the free circulation of cooling air achieved by the machine and which attains its full advantage when bare secondary conductors are used.

The machine is simple and compact. Because there are no brushes, the sturdiness and reliability of the machine are high and the required maintenance is low. Complex circuitry and tubes or switching devices and rectifiers commonly used to control the secondary impedance and thereby the speed of induction motors is eliminated.

Those skilled in the art will appreciate that various changes and modifications can be made in the preferred form of apparatus described herein without departing from the spirit and scope of the invention.

I claim:

1. A brushless alternating current dynamoelectric machine having an adjustable secondary impedance comprising a stator having first and second magnetically separate and axially aligned cores of magnetic material and a rotor supported for rotation within said stator and having a first core of magnetic material magnetically associated with said first stator core and a second core of saturable magnetic material magnetically associated with said second stator core, said first stator core having a primary winding adapted to be energized from an alternating current power source for providing a rotating flux field linking said first stator and rotor cores, said second stator core having a control winding adapted to be energized from a direct current power source for providing a unidirectional stationary flux field liking said second stator and rotor cores and controlling the degree of saturation of said second rotor core, and a secondary winding comprising conductors mounted in and extending generally axially of and between said rotor cores and in magnetic relationship with said second rotor core and electrically connected together to provide a plurality of closed secondary circuits whereby the impedance of the secondary circuits varies in accordance with the degree of saturation of said second rotor core.

2. A brushless adjustable-speed alternating current motor comprising a stator having windings for providing a revolving flux field when energized from an alternating current power source, a shaft supported for rotation within said stator, a core mounted on said shaft in flux linking relationship with the field of said stator, secondary conductors carried by said core having a first portion in flux cutting relationship with the field of said stator and a second portion extending axially beyond said stator, saturable magnetic material mounted on said shaft for rotation therewith in flux linking relationship with said second portion of the secondary conductors, and stationary electromagnetic means for providing a unidirectional flux field when energized from a direct current power source in flux linking relationship with said saturable magnetic material for controlling the degree of saturation of said saturable magnetic material and thereby the impedance of said secondary conductors and the speed of said motor.

3. A brushless induction motor having an adjustable secondary impedance comprising a shaft supported for rotation, a pair of axially spaced magnetic cores mounted on said shaft, secondary circuit means having conductors carried by and extending axially of and between the peripheral portions of said cores, first stationary electromagnetic means for providing a revolving flux field in flux linking relationship with one of said cores, and second stationary electromagnetic means for providing a stationary unidirectional flux field in flux saturating relationship with the other of said cores whereby the impedance of said secondary circuit means is controlled by said second electromagnetic means.

4. The apparatus according to claim 3 in which said secondary conductors comprise bare metallic bars of generally rectangular cross section arranged and joined at their ends to form single turn coils each having a span approximately equal to the pole pitch of the induction motor.

5. The apparatus according to claim 4 in combination with a case having a side and end walls and substantially enclosing said apparatus, said walls having openings therethrough to permit air to pass into and out of said case and around and next to said apparatus within said case upon the urging of those portions of said secondary conductors extending between and beyond said shaft-mounted, axially spaced cores provided when said cores rotate upon said shaft.

6. A brushless speed control for a wound rotor induction motor having a shaft mounted secondary circuit comprising a saturable reactor having a core of saturable magnetic material mounted on the shaft of the induction motor for rotation therewith, windings carried by said core in flux linking relationship therewith, rectifiers mounted on said motor shaft for rotation therewith and electrically connected between the secondary circuit of the motor and said windings carried by said core whereby the alternating current output of the secondary is rectified and tends to saturate said core, a stator in flux linking relationship with said core and adapted to produce a unidirectional flux field when energized by a D.C. control signal for controlling the degree of saturation of said core and thereby the impedance of said windings and secondary circuit and thus the torque of the induction motor.

7. In combination with an induction motor having a wound rotor secondary mounted on a shaft supported for rotation within a stator, means for controlling the secondary impedance of the motor comprising a saturable reactor having a core mounted on the motor shaft for rotation therewith, rectifying elements mounted on the motor shaft for rotation therewith and connected in circuit with the motor secondary, conductors in circuit with said rectifying elements extending to and in magnetic relationship with said core, and stationary electromagnetic means in flux controlling relationship with said core for controlling the saturation of said core and thereby the impedance of said conductors and the secondary of the motor.

References Cited in the file of this patent

UNITED STATES PATENTS

| 1,500,834 | MacMillan | July 8, 1924 |
| 2,432,982 | Braddon | Dec. 23, 1947 |
| 2,722,652 | Brainard | Nov. 1, 1955 |
| 2,817,051 | Rhyni | Dec. 17, 1957 |

FOREIGN PATENTS

| 636,934 | Germany | June 30, 1934 |